(No Model.)
J. FRECH & E. MISSEL.
HAY TURNING FORK.
No. 389,069. Patented Sept. 4, 1888.
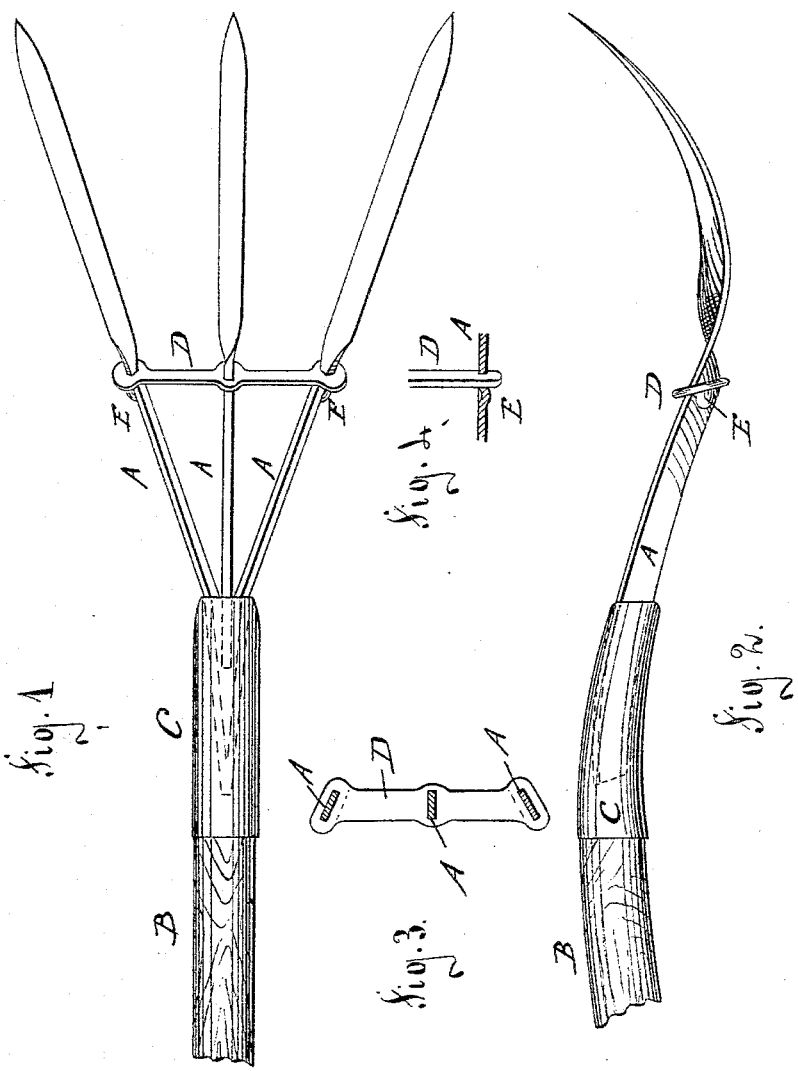
WITNESSES:
Henry Huber,
Carl Karp
INVENTORS,
Johann Frech, and
Elias Missel.
BY
Goepel & Raegener
ATTORNEYS

UNITED STATES PATENT OFFICE.

JOHANN FRECH, OF SCHORNDORF, AND ELIAS MISSEL, OF STUTTGART, WÜRTEMBERG, GERMANY.

HAY-TURNING FORK.

SPECIFICATION forming part of Letters Patent No. 389,069, dated September 4, 1888.

Application filed February 18, 1888. Serial No. 264,447. (No model.) Patented in Germany July 16, 1887, No. 42,627; in Austria-Hungary March 24, 1888, No, 43,975, and in Denmark May 1, 18-8, No. 638.

*To all whom it may concern:*

Be it known that we, JOHANN FRECH, of Schorndorf, and ELIAS MISSEL, of Stuttgart, Würtemberg, Germany, have invented certain new and useful Improvements in Hay-Turning Forks, (which have heretofore been patented to us by the Government of Germany, dated July 16, 1887, No. 42,627; Austria-Hungary, dated March 24, 1888, No. 43,975, and Denmark, dated May 1, 1888, No. 638,) of which the following is a specification.

This invention relates to certain new and useful improvements in hay-forks; and the object of our invention is to provide a new and improved hay-fork which is simple in construction, strong and durable, and which is adapted for use as a lifting, spreading, or turning fork.

The invention consists in the combination, with a handle, of tines held in one end of the same diverging from said end of the handle, and a cross bar uniting and bracing the tines.

The invention also consists in the construction and combination of parts and details, as will be fully described and set forth hereinafter, and finally pointed out in the claims.

In the accompanying drawings, Figure 1 is a top view of our improved hay-fork. Fig. 2 is a side view of the same. Fig. 3 is a transverse sectional view. Fig. 4 is a detail view showing one of the tines in longitudinal section.

Similar letters of reference indicate corresponding parts.

The tines A are composed of steel rods having a quadrilateral cross-section. The rear ends of the tines are welded together and inserted in one end of the handle B, in which they are retained by the ferrule C. The side tines diverge from their united ends toward their free ends, the sides of the outer tines being inclined toward the opposite sides of the central tine. The tines are braced and united about midway of their length by a cross-bar, D, having a central slot and two inclined end slots for receiving the tines. For the purpose of keeping the cross-piece in place, a part of each side tine is forced or driven outward to form a bulge, E, at the rear side of the cross-piece. In front of the cross piece the tines are bent axially about ninety degrees, so that the rear parts of the tines stand edgewise and the front parts are flat. The tines are curved, as shown, from the rear to the front ends and pointed.

This fork has great stability and rigidity against lateral strains as well as against strains acting in the direction toward the top or bottom of the fork.

Having thus described our invention, we claim as new and desire to secure by Letters Patent—

1. A hay-fork having tines diverging from the ends held in the handle and united about midway of their length by a cross-bar, substantially as herein shown and described.

2. In a hay-fork, the combination, with a handle, of three tines, the central tine being in line with the handle and the two side tines diverging, the sides of the side tines being at an inclination to the sides of the central tine, and a cross-piece uniting the tines having slots through which the tines are passed, substantially as shown and described.

3. In a hay-fork, the combination, with a handle, of three tines held on one end of the same, and a cross-piece uniting the tines about midway of the length, said tines being turned axially about ninety degrees in front of the cross-piece, substantially as shown and described.

4. In a hay-fork, the combination, with a handle, of three tines held on one end of the same, a cross-piece uniting the tines about midway of their length, said tines being turned axially about ninety degrees in front of the cross-piece and having the bulges E directly behind the cross-piece, substantially as herein shown and described.

In testimony that we claim the foregoing as our invention we have signed our names in presence of two subscribing witnesses.

JOHANN FRECH.
ELIAS MISSEL.

Witnesses:
CARL FISCHER,
F. BECKER.